United States Patent Office 3,043,749
Patented July 10, 1962

3,043,749
PREPARATION OF 2-KETO-L-GULONIC ACID
Hsing T. Huang, Groton, Conn., assignor to Chas. Pfizer & Co., Inc., New York, N.Y., a corporation of Delaware
No Drawing. Filed July 28, 1960, Ser. No. 45,783
5 Claims. (Cl. 195—47)

This application is concerned with a novel method for the preparation of 2-keto-L-gulonic acid. More particularly, it is concerned with an improved method for the production of 2-keto-L-gulonic acid by microbiological means.

2-keto-L-gulonic acid,

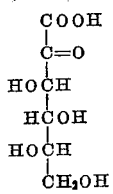

is an important and valuable intermediate in the production of L-ascorbic acid, also known as vitamin C, an essential vitamin in human nutrition. In the past, 2-keto-L-gulonic acid has been made from L-sorbose by oxidation of the primary alcohol group at the $C_1$ position with permanganate. In order to protect the primary alcohol group at the $C_6$ position, it has been necessary to first treat the sorbose with acetone in the presence of sulfuric acid, forming the diacetone derivative. Following the oxidation, it has then been necessary to hydrolyze the resulting diisopropylidene derivative in order to obtain the product.

A novel process has now been discovered which for the first time permits the selective biochemical oxidation of L-sorbose to 2-keto-L-gulonic acid in one step. The organisms which effect this conversion are certain members of the genus Pseudomonas. Among those having this ability are the following species:

P. viridiflava
P. putida
P. fragi
P. syringae
P. asplenii
P. cichorii
P. lapsa
P. savastanoi
P. tonelliana
P. viridilivida
P. washingtoniae P. coronafaciens
P. lachrymans
P. delphinii
P. aureofaciens
P. ovalis
P. alliicola
P. tomato
P. striata
P. reptilivora
P. saccharophila A number of strains of these species are publicly available in culture collections, both in the United States and abroad. The following is a partial list of such cultures: P. alliicola NRRL B–915, ATCC 10854; P. asplenii NRRL B–733, B–829, ATCC 10203; 10855; P. aureofaciens NRRL B–1482R; P. cichorii NRRL B–832, ATCC 10857; P. coronafaciens NRRL B–833, ATCC 9005; P. delphinii NRRL B–790, ATCC 8719; P. fragi NRRL B–25, ATCC 4973; P. lachrymans NRRL B–799, ATCC 7386, 11921, 11965; P. lapsa NRRL B–842, ATCC 10859; P. ovalis NRRL B–1595, ATCC 950, 8209; M.D. 18.1; P. putida NRRL B–13, ATCC 4359; P. reptilivora NRRL B–963; P. saccharophila NRRL B–1492, NCIB 8570; P. savastanoi NRRL B–874, M.D. 19.1; P. striata NRRL B–2022; P. syringae NRRL B–32, ATCC 825, 7432, 12271, 12326, 12273, 12274; P. tomato NRRL B–882, ATCC 10862; P. tonelliana NRRL B–885; P. viridilivida NRRL B–893, ATCC 512; P. viridiflava NRRL B–894; P. washingtoniae NRRL B–899.

ATCC=American Type Culture Collection, Washington, D.C.
NRLL=Northern Regional Research Laboratory, Peoria, Ill.
M.D.=Stanford University Hopkins Marine Station, Pacific Grove, Calif.
NCIB=National Collection of Industrial Bacteria, Chemical Research Laboratory, Teddington, Middlesex, England.

In addition, strains of some of these species are maintained at the Plant Diseases Division of the Department of Bacteriology, Auckland, New Zealand; the Plant Pathology Unit of the Botany and Plant Pathology Division, Science Service, Ottawa, Ontario; the Cambridge Botany School, Downing Street, London; and in many other public culture collections.

It is to be understood that for the production of 2-keto-L-gulonic acid according to the present invention, limitation to the aforesaid organisms is not intended. It is especially desired and intended to include mutants produced from the aforesaid organisms by various means such as irradiation with X-rays or ultraviolet light, treatment with nitrogen mustards, and the like. In addition, it is, of course, anticipated that other species of the genus Pseudomonas may be found to possess the ability to effect the desired conversion of L-sorbose. However, it has been found that not all Pseudomonas have this ability. For example, P. aeruginosa does not. A method for classifying organisms with respect to 2-keto-L-gulonic acid-producing ability is described hereinafter.

The production of 2-keto-L-gulonic acid is effected by the cultivation of one of the 2-keto-L-gulonic acid-producing organisms in aerated deeptank, i.e., submerged, fermentation. In order to obtain high yields, certain conditions must be maintained. The fermenation should be conducted at pH values between about six and nine, but preferably between eight and nine. Although the temperature is not critical, best results are usually obtained between about 25° and about 40° C., and a temperature from about 25° to about 35° C. is preferred. In general, from about one to about four days are required to obtain the best yields, and from about 50 to about 70 hours is found most suitable.

A source of nitrogen, which may be organic or inorganic, is essential to the growth of the organism. Substances which are suitable nitrogen sources include ammonia, urea, and amino acids, such as tyrosine and p-hydroxyphenylglycine, or their hydrohalide salts. An economical source of amino acids is hydrolyzed protein which contains appreciable amounts of amino acids, and commercially available hydrolyzed casein products containing about 6–7% of amino nitrogen are found to be particularly suitable for obtaining the desired conversion. For best yields of product, concentrations of casein hydrolysate of from about one to about ten g./liter of fermentation medium are usually employed, and preferably from two to five g./liter.

A source of carbon is also necessary for the growth of the organism. If an organic nitrogen source is employed, this substance may also fulfill the role of the carbon source. In addition, auxiliary carbon sources may sometimes be beneficial although these are by no means essential. Auxiliary sources of carbon which are found to be suitable include glycerol, sucrose, lactose, maltose, mannitol and sorbitol.

It is often beneficial to furnish other growth factors, which are contained in yeast extract, to the organism. The yeast extract is suitably added to the fermentation medium in a concentration of from about 0.05 to about 0.5 g./liter.

The concentration of L-sorbose is not critical for this reaction, but from about 1 to about 100 g./liter of the fermentation medium will usually be employed and preferably from about 5 to about 20 g./liter.

A source of minerals, including potassium and magnesium salts, is also necessary for growth of the organism. These are frequently present as naturally occurring constituents of some of the other ingredients, such as casein hydrolysate. This source is often adequate, but may be supplemented by addition of salts, such as the phosphates or sulfates, of these metals. The various trace metals, including iron and copper, may be added separately to the nutrient medium in the form of their salts, or incorporated by employing tap water, which already contains such salts, for the preparation of the growth medium.

For the successful operation of the novel process of this invention it is, of course, essential to employ a 2-keto-L-gulonic acid-producing organism. Organisms are tested and classified for this ability in the following manner: The proposed organism is rinsed from an agar slant under sterile conditions into a previously sterilized medium. This medium is to be one which conforms to the compositions outlined above as suitable for the reaction. For example, the medium may have the following composition.

| | G./liter |
|---|---|
| $KH_2PO_4$ | 0.4 |
| $MgSO_4 \cdot 7H_2O$ | 0.2 |
| Hydrolyzed casein | 2.5 |
| Yeast extract | 0.5 |
| Sorbose | 10 |
| Glycerol | 2 |

After the addition of the organism, the inoculum is maintained at about 28° C. with agitation for a period of from about two to about three days. During this period air may be supplied by diffusion, as, for example, through a cotton plug, or by forced aeration.

At the conclusion of the incubation period the broth is filtered and a portion of the filtrate is applied to a strip of paper. From about 5 to about 40 microliters is usually sufficient. A chromatogram is then developed, according to the procedure well known to those skilled in the art of paper chromatography, employing the solvent system: ethyl acetate, acetic acid, water in the proportions 11:2:2 parts by volume. The developed chromatogram is then treated with o-phenylenediamine reagent, heated at about 70° C., and examined under ultraviolet light for the yellow fluorescent spot characteristic of 2-keto-L-gulonic acid. Under these conditions the desired acid has an R value of about 0.6 relative to sorbose as 1.0. However, it is preferred to locate the spot more accurately by simultaneously developing another paper strip chromatogram prepared from a sample of pure 2-keto-L-gulonic acid. When the aforementioned procedure is employed, those organisms which are suited to the practice of this invention by virtue of their 2-keto-L-gulonic acid-producing ability are readily detected by the appearance of the characteristic spot in the developed chromatogram of the broth.

In addition to establishing the 2-keto-L-gulonic acid-producing ability of organisms, the size of the spot may be employed in a semi-quantitative fashion to estimate the 2-keto-L-gulonic acid content of broths at various stages of incubation, and to select the optimum time for halting the reaction and isolating the product. Ordinarily, the reaction will be continued until a concentration of at least about 0.1 g. per liter of product is attained in the broth.

The product, 2-keto-L-gulonic acid, may be isolated from the filtered broth by standard procedures, such as the ion-exchange methods well known to those skilled in the art. For example, the broth may be treated with acation-exchange resin and the product absorbed on an anion-exchange resin and eluted with a base such as aqueous ammonium hydroxide.

By employing one of the 2-keto-L-gulonic acid-producing organisms under the preferred conditions described, 2-keto-L-gulonic acid of high purity is obtained directly from L-sorbose in one step, without the disadvantages of the chemical method. It is particularly surprising that oxidation of the primary hydroxyl group at the $C_1$ position of sorbose is obtained without oxidation of the primary hydroxyl group at the $C_6$ position. The 2-keto-L-gulonic acid is readily converted to ascorbic acid by enolization and formation of the lactone ring, as described in the literature.

This application is a continuation in part of application Serial No. 763,811, filed September 29, 1958 and now abandoned.

The following examples are given by way of illustration and are not to be construed as limitations of this invention, many variations of which are possible within the scope and spirit thereof.

*Example I*

*P. viridiflava*, NRRL B–894, is rinsed from an agar slant under sterile conditions into a Fernbach flask containing one liter of the following aqueous inoculum medium, previously sterilized in an autoclave at 20 lbs. per square inch steam pressure:

| | G./liter |
|---|---|
| $KH_2PO_4$ | 0.4 |
| $MgSO_4 \cdot 7H_2O$ | 0.2 |
| NZ-amine B[1] | 2.5 |
| Yeast extract | 0.5 |
| Sorbose (sterilized separately) | 10 |
| Glycerol (sterilized separately) | 2 |

The inoculum is maintained at 28° C. with shaking for sixteen hours.

A basal medium is prepared for the actual production of 2-keto-L-gulonic acid. This medium has the following composition:

| | G./liter |
|---|---|
| NZ-amine B[1] | 5 |
| Yeast extract | 0.5 |
| Sorbose (sterilized separately) | 20 |

[1] NZ-amine B is a mixture of amino acids and peptides, formed by enzymatic hydrolysis of casein, which is available from Sheffield.

Two liters of the above medium are sterilized in an autoclave at 20 lbs. per square inch for 20 minutes. 100 ml. of the incubated inoculum is added to two liters of the basal medium in a fermenter having a total volume of four liters. Incubation is conducted at 28° C. with stirring at the rate of 1750 r.p.m. and with aeration at the rate of one volume of air per volume of reaction mixture per minute. During the reaction the pH rises to 8 and higher. The progress of the reaction is followed by withdrawing samples and estimating the 2-keto-L-gulonic acid content by paper chromatography with the solvent system: ethyl acetate, acetic acid, water in the proportions 11:2:2 parts by volume. The developed chromatogram is treated with o-phenylenediamine reagent and heated at 70° C. When the chromatogram is examined under ultraviolet light a characteristic yellow fluorescent spot is obtained representing the desired product. It can be distinguished from other spots by its characteristic position and color.

After sixty hours' incubation, the product is recovered from the mixture by ion-exchange treatment:

The broth is filtered and the filtrate is passed over Amberlite IR 120 cation-exchange resin, a sulfonated, cross-linked styrene copolymer in the hydrogen cycle. The product is then adsorbed on Amberlite IR 45 resin, a weakly basic polyamine anion exchanger in the free-base form. (Both resins are available from Rohm & Haas, Inc.) The product is then eluted with 1 N ammonium hydroxide, and the eluate is concentrated and decolorized with activated carbon. The pH is adjusted to about 1.5 by further treatment with IR 120 resin and calcium carbonate and calcium hydroxide are then added to a pH of 6–6.5. The resulting slurry is filtered to remove calcium phosphate and other salts, and the pH of the filtrate is again adjusted to 1.5 with IR 120 resin. The acidified solution is passed over IR 45 resin and fractional elution with 0.1 N ammonium hydroxide gives a purified solution which is concentrated to a small volume. The product is converted to the sodium salt which is recovered as a crystalline solid. A solution of the product in water at 24° C. at a concentration of 1 g./100 ml. has a specific optical rotation of −24.4°. It can be converted to L-ascorbic acid by known means.

*Example II*

P. putida, NRRL B–13, is rinsed into one liter of the following sterilized aqueous inoculum medium:

| | G./liter |
|---|---|
| $KH_2PO_4$ | 0.4 |
| $MgSO_4.7H_2O$ | 0.2 |
| Hydrolyzed casein | 1.0 |
| Yeast extract | 0.05 |
| Sorbose (sterilized separately) | 2.0 |
| Lactose (sterilized separately) | 0.5 |

The inoculum is maintained at 28° C. with shaking for 16 hours, and 100 ml. of the incubated inoculum is added to two liters of the same sterilized medium in a fermenter. Incubation is continued at 28° C. under the conditions of Example I until a satisfactory 2-keto-L-gulonic acid content is achieved, as estimated by paper chromatography. The product is recovered as described in Example I.

*Example III*

P. fragi, NRRL B–25, is rinsed into one liter of the following sterilized aqueous inoculum medium:

| | G./liter |
|---|---|
| Hydrolyzed casein | 10.0 |
| Sorbose (sterilized separately) | 100.0 |

The inoculum is maintained at 28° C. with shaking for 16 hours, and 100 ml. of the incubated inoculum is added to two liters of the same sterilized medium in a fermenter. Incubation is continued at 28° C. under the conditions of Example I until a satisfactory 2-keto-L-gulonic acid content is achieved, as estimated by paper chromatography. The product is recovered as described in Example I.

*Example IV*

P. syringae, NRRL B–32, is rinsed into one liter of the following sterilized aqueous inoculum medium:

| | G./liter |
|---|---|
| $KH_2PO_4$ | 0.4 |
| $MgSO_4.7H_2O$ | 0.2 |
| Urea | 1.5 |
| Yeast extract | 0.5 |
| Sorbose (sterilized separately) | 5.0 |
| Sucrose (sterilized separately) | 1.0 |

Adjust pH to 8.

The inoculum is maintained at 25° C. with shaking for 16 hours, and 100 ml. of the incubated inoculum is added to two liters of the same sterilized medium in a fermenter. Incubation is continued at 25° C. under the conditions of Example I until a satisfactory 2-keto-L-gulonic acid content is achieved, as estimated by paper chromatography. The product is recovered as described in Example I.

*Example V*

P. asplenii, NRRL B–733, is rinsed into one liter of the following sterilized aqueous inoculum medium:

| | G./liter |
|---|---|
| $KH_2PO_4$ | 0.4 |
| $MgSO_4.7H_2O$ | 0.2 |
| $(NH_4)_2HPO_4$ | 3.0 |
| $(NH_4)_2SO_4$ | 1.5 |
| Yeast extract | 0.5 |
| Sorbose (sterilized separately) | 10.0 |
| Glycerol (sterilized separately) | 2.0 |

Adjust pH to 8.5 with $NH_4OH$.

The inoculum is maintained at 35° C. with shaking for 16 hours, and 100 ml. of the incubated inoculum is added to two liters of the same sterilized medium in a fermenter. Incubation is continued at 35° C. under the conditions of Example I until a satisfactory 2-keto-L-gulonic acid content is achieved, as estimated by paper chromatography. The product is recovered as described in Example I.

*Example VI*

The procedure of Example I is followed, substituting one of the following organisms for P. viridiflava:

P. cinchorii, NRRL, B–832
P. lapsa, NRRL, B–842
P. savastanoi, NRRL, B–874
P. tonelliana, NRRL, B–885
P. viridilivida, NRRL, B–893
P. washingtoniae, NRRL, B–899
P. coronafaciens, NRRL, B–833
P. lachrymans, NRRL, B–799
P. delphinii, NRRL, B–790
P. aureofaciens, NRRL, B–1482R
P. ovalis, NRRL, B–1595
P. alliicola, NRRL, B–915
P. tomato, NRRL, B–882
P. striata, NRRL, B–2022
P. reptilivora, NRRL, B–963
P. saccharophila, NRRL, B–1492

2-keto-L-gulonic acid is isolated by the ion-exchange procedure described in Example I.

What is claimed is:

1. A process for the preparation of 2-keto-L-gulonic acid from L-sorbose which process comprises cultivating under submerged aerobic conditions at a pH of from about six to about nine a 2-keto-L-gulonic acid-producing species of the genus Pseudomonas in an aqueous nutrient medium comprising L-sorbose, a source of nitrogen, a source of carbon and a source of minerals.

2. A process for the preparation of 2-keto-L-gulonic acid from L-sorbose which process comprises cultivating under submerged aerobic conditions at a pH of from about six to about nine an organism selected from the group consisting of Pseudomonas viridiflava, P. putida, P. fragi, P. syringae, P. asplenii, P. cichorii, P. lapsa, P. savastanoi, P. tonelliana, P. viridilivida, P. washingtoniae, P. coronafaciens, P. lachrymans, P. delphinii, P. aureofaciens, P. ovalis, P. alliicola, P. tomato, P. striata, P. reptilivora, and P. saccharophila, in an aqueous nutrient medium comprising L-sorbose, a source of nitrogen, a source of carbon, and a source of minerals.

3. A process as claimed in claim 1 wherein said source of nitrogen is hydrolyzed casein at a concentration of from about one to about ten grams per liter of fermentation medium.

4. A process as claimed in claim 1 wherein said nutrient medium contains from about 0.05 to about 0.5 g./liter of yeast extract.

5. A process as claimed in claim 1 wherein the L-sorbose is incorporated in the fermentation medium at a concentration of from about one to about one hundred grams per liter of said medium.

References Cited in the file of this patent

UNITED STATES PATENTS

| | | |
|---|---|---|
| 2,421,611 | Gray | June 3, 1947 |
| 2,917,435 | Perlman | Dec. 15, 1959 |
| 2,948,659 | Shoemaker | Aug. 9, 1960 |

FOREIGN PATENTS

| | | |
|---|---|---|
| 496,848 | Canada | Sept. 16, 1942 |

OTHER REFERENCES

Levine et al.: A Compilation of Culture Media, 1930, p. 216, Williams & Wilkins Co., Baltimore, QR 71L4.